United States Patent
Liu et al.

(10) Patent No.: US 9,965,420 B2
(45) Date of Patent: May 8, 2018

(54) SLAVE DEVICE ALERT SIGNAL IN INTER-INTEGRATED CIRCUIT (I2C) BUS SYSTEM

(71) Applicant: FREESCALE SEMICONDUCTOR, INC., Austin, TX (US)

(72) Inventors: Bingkun Liu, Suzhou (CN); Huangsheng Ding, Suzhou (CN); Yang Liu, Suzhou (CN)

(73) Assignee: NXP USA, INC., Austin, TX (US)

( * ) Notice: Subject to any disclaimer, the term of this patent is extended or adjusted under 35 U.S.C. 154(b) by 155 days.

(21) Appl. No.: 15/254,962

(22) Filed: Sep. 1, 2016

(65) Prior Publication Data

US 2017/0109305 A1  Apr. 20, 2017

(30) Foreign Application Priority Data

Oct. 15, 2015 (CN) .......................... 2015 1 0900126

(51) Int. Cl.
*G06F 13/36* (2006.01)
*G06F 13/42* (2006.01)
*G06F 13/362* (2006.01)

(52) U.S. Cl.
CPC ........ *G06F 13/362* (2013.01); *G06F 13/4282* (2013.01)

(58) Field of Classification Search
CPC ............................ G06F 13/362; G06F 13/4282
USPC ......................................................... 710/110
See application file for complete search history.

(56) References Cited

U.S. PATENT DOCUMENTS

| | | | |
|---|---|---|---|
| 2005/0165989 A1* | 7/2005 | Kim ........................ | G06F 13/24 710/260 |
| 2007/0016708 A1* | 1/2007 | Park .................... | G06F 13/4022 710/110 |
| 2007/0162671 A1* | 7/2007 | Seo ..................... | G06F 13/4282 710/110 |
| 2008/0117994 A1* | 5/2008 | Shetty .................... | H04L 25/45 375/257 |
| 2013/0170575 A1* | 7/2013 | Imai ........................ | G06F 1/10 375/285 |
| 2013/0304999 A1* | 11/2013 | Imai .................... | G06F 13/4291 711/154 |
| 2014/0025851 A1* | 1/2014 | Decesaris ............. | G06F 13/385 710/110 |
| 2014/0310436 A1* | 10/2014 | Du ........................ | G06F 13/362 710/110 |
| 2014/0337553 A1 | 11/2014 | Du et al. | |

(Continued)

OTHER PUBLICATIONS

NXP Semiconductors, I2C-bus specification and user manual, Rev. 6, Apr. 4, 2014, UM10204, http://www.nxp.com.

*Primary Examiner* — Christopher Shin
(74) *Attorney, Agent, or Firm* — Charles E. Bergere

(57) ABSTRACT

A system having master and slave devices and communicating over an I2C bus has SDA and a SCL lines that are normally high unless a device pulls the voltage of the line Low. Normal data signals on the SDA line are set during the low phase of the clock signals on the SCL line and transferred to a receiver during the high phase of the clock signals. A slave device provides an alert signal on the SDA line during the low phase of the clock signals to send an alert signal to the master device. The alert signal may be a pulse signaling the slave device wakeup or a pulse pattern identifying the alerting slave device.

20 Claims, 3 Drawing Sheets

(56) References Cited

U.S. PATENT DOCUMENTS

| | | | |
|---|---|---|---|
| 2015/0026526 A1* | 1/2015 | Mondal | G06F 11/221 714/43 |
| 2015/0339248 A1* | 11/2015 | Choi | G06F 13/364 710/110 |
| 2015/0363353 A1* | 12/2015 | Enami | G06F 13/4282 710/110 |
| 2016/0004659 A1* | 1/2016 | Otoshi | G06F 13/4022 710/310 |
| 2016/0011887 A1* | 1/2016 | Chung | G06F 9/4416 713/2 |
| 2016/0117274 A1* | 4/2016 | Waters | G06F 13/362 710/106 |
| 2016/0124896 A1* | 5/2016 | Pitigoi-Aron | H04L 25/4923 710/110 |
| 2016/0232124 A1* | 8/2016 | Zheng | G06F 13/4282 |

* cited by examiner

US 9,965,420 B2

SLAVE DEVICE ALERT SIGNAL IN INTER-INTEGRATED CIRCUIT (I2C) BUS SYSTEM

BACKGROUND

The present invention is directed to integrated circuits and, more particularly, to alert signaling from a slave device in an inter-integrated circuit (I2C) bus system.

The I2C (also known as I²C and IIC) bus system is a de facto standard described in "I2C-bus specification and user manual" UM10404 of NXP Semiconductors B.V. The I2C bus system is a bidirectional two-line bus for efficient communication and control between master and slave integrated circuit (IC) devices (or nodes) coupled by the bus. A master is the device that initiates a data transfer on the bus and generates the clock signals to permit that transfer. Any device addressed is considered a slave.

The two-line I2C bus has a serial data (SDA) line and a serial clock (SCL) line. Both the SDA and SCL lines are bidirectional lines, connected to a voltage supply, such as $V_{DD}$, through a current source or a pull-up resistor. The high voltage of the I2C bus standard is described as positive, but it will be appreciated that the polarity of the voltages could be inverted. Pulling the line low is normally considered a logical zero (de-assert) while letting the line float high is a logical one (assert). Multiple nodes may be driving the lines simultaneously. If any node is driving the line low, the line will be at low voltage. Nodes that are trying to transmit a logical one by letting the line float high can detect that another node is active at the same time by the fact that the line voltage is pulled low.

Data is transmitted in I2C frames on the SDA line in 8-bit bytes, with each byte followed by an Acknowledge (ACK) bit or a Not Acknowledge (NACK) bit, and clocking information is transmitted on the SCL line. While the SCL line is low, the transmitter (initially the master device) can set the SDA line to the voltage corresponding to the bit to be transmitted and then must wait until sufficiently long after the SCL line has actually gone high for the receiver to register the signal.

Slave devices may hold the SCL line low, giving slave devices a flow control mechanism called clock stretching. If a master transmitter does not have the optional clock stretching function, it will send data without waiting for the SCL line to be high in fact, and the data signal can be lost or crushed. I2C also can be used to wake up a slave microcontroller unit (MCU) device from low power mode (sleep). However, the power management controller (PMC) and clock of the slave MCU take time to wake up. The I2C bus can be held during the wake up delay, by waiting long enough to cover the worst case, by slowing the clock and data frequencies, or by performing repeat starts until receiving a correct ACK signal. However, such actions deteriorate latency and reduce transfer speed.

In the related System Management Bus (SMBus) system, the bus has a third line that can be used for a slave device to send an alert signal to the master device. The alert signal can be a ready signal from an addressed slave device, or can signal a claim to priority when the master device is communicating with other slave devices. This procedure requires the third line and the protocol is slow, since the master device sends a message to the general address of all slave devices in the system, after which the slave device that initiated the alert sends its address.

It would be advantageous to have an I2C bus system where alert signals can be sent from a slave device to a master device that does not systematically deteriorate the latency or speed of the system and that does not require a third bus line nor use of a General-Purpose Input/Output (GPIO) pin.

BRIEF DESCRIPTION OF THE DRAWINGS

The present invention, together with objects and advantages thereof, may best be understood by reference to the following description of embodiments thereof shown in the accompanying drawings. Elements in the drawings are illustrated for simplicity and clarity and have not necessarily been drawn to scale.

DETAILED DESCRIPTION

Figure 1:
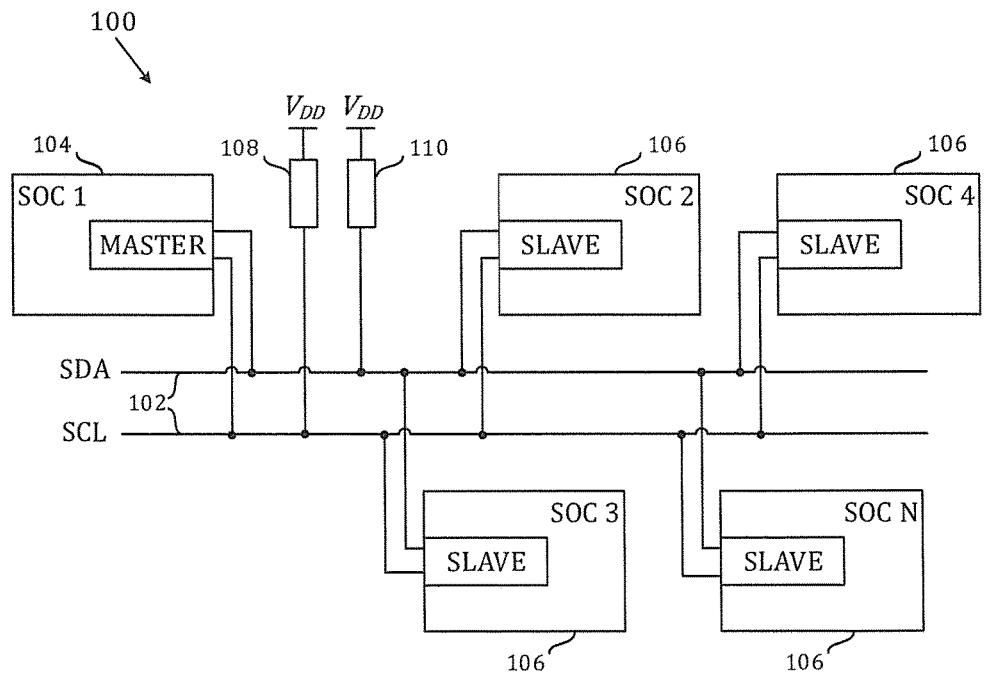
FIG. 1 is a schematic block diagram of an I2C bus system having a single master device and a plurality of slave devices in which the present invention can be implemented.
Figure 2:
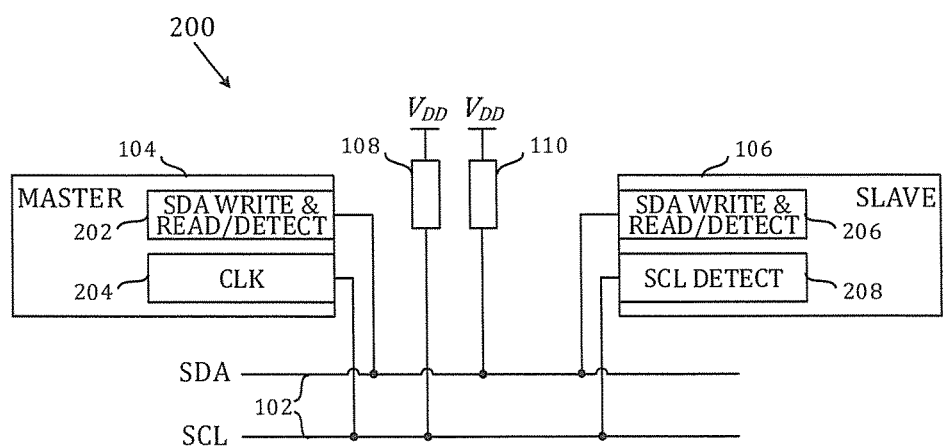
FIG. 2 is a schematic block diagram of an I2C bus system having a single master device and a single slave device in which the present invention can be implemented.

FIGS. 1 and 2 illustrate I2C bus systems 100 and 200 in which the present invention can be implemented. The I2C bus systems 100 and 200 have a bidirectional two-line bus 102 comprising a serial data line SDA and a serial clock line SCL for communication and control between master and slave integrated circuit (IC) devices 104 and 106. Each of the master and slave devices 104, 106 may be a system on chip (SOC) on a separate IC, or may be an individual module in a common IC. In the I2C bus system 100 a plurality of slave IC devices 106 can be coupled for communication and control with the master device 104 by the bus. There can be a plurality of master devices 104, and the I2C standard provides an arbitration protocol to resolve conflicts between signals from different masters. In the I2C bus system 200, a single master device 104 communicates over the I2C bus 102 with a single slave device 106.

In the I2C bus systems 100 and 200, the SDA line and the SCL line are connected to a voltage supply $V_{DD}$ through a current source or a pull-up resistor 108 and 110. The SDA line and the SCL line are normally high (at high voltage) unless a device pulls the voltage of the line low. If any node is driving the line low, the line will be at low voltage. Nodes that are trying to transmit a logical one by letting the line float high can detect that another node is active at the same time by the fact that the line voltage is pulled low.

In an I2C bus system 100 or 200 in accordance with the present invention, the master device 104 provides clock signals having high and low phases to the SCL line. A master or slave device as transmitter sets normal data signals on the SDA line during the low phase of the clock signals on the SCL line and the normal data signals are transferred to another device as receiver during the high phase of the clock signals on the SCL line. A slave device 106 provides an alert pulse on the SDA line during the low phase of the clock signals on the SCL line to send an alert signal to the master device.

With this embodiment of the invention, alert signals can be sent from a slave device to a master device without systematically deteriorating the latency or speed of the system and without requiring a third bus line nor use of a GPIO pin. The master device 104 can have functional logic to detect an alert pulse from the slave device 106 on the SDA line (for example in the case where there is a single master device and single slave device in the bus system), or to store pattern values of an alert signal from the slave device 106 during the SCL low phase (for example in the case where there is more than one slave device in the bus system). The master device can then send an address, a command or data to the slave device that raised the alert signal.

In the presently preferred embodiment, the master device 104 has an SDA detector module 202 that detects normal data signals on the SDA line during the high phase of the clock signals on the SCL line, and detects pulses of the alert signal on the SDA line during the low phase of the clock signals on the SCL line. The module 202 may also write data on the SDA line during the high phase of the clock signals as well as detecting alert signals during the low phase of the clock signals. The master device 104 also has a clock signal generator 204 for providing the clock signals on the SCL line.

The slave device 106 may have a sleep mode during which elements of the alerting slave device are non-operational. The alerting slave device 106 provides the alert signal when exiting the sleep mode and becoming operational for receiving normal data signals. In the case where the I2C bus system comprises a single master device 104 and a single slave device 106, the master device 104 may detect an alert signal comprising a pulse (or toggle) on the SDA line. The master device 104 may hold the normal data signals until the master device 104 detects the alert signal.

In the presently preferred embodiment, the I2C slave device 106 has an SCL detector 208 that detects the high and low phases of the clock signals on the SCL line, and an alert signal module 206 that provides the alert signal on the SDA line during the low phase of the clock signals on the SCL line. The alert signal module 206 may also read and write data on the SDA line during the high phase of the clock signals as well as providing alert signals during the low phase of the clock signals.

Figure 3:
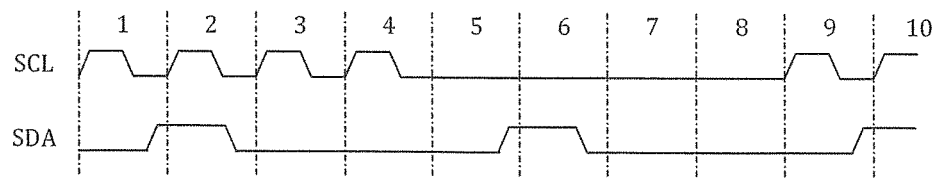
FIGS. 3 and 4 are graphs against time of signals appearing in operation of the I2C bus systems of FIGS. 1 and 2 for the case where there is a single master device and single slave device in the bus system, and for the case where there is more than one slave device in the bus system, respectively.

FIG. 3 illustrates examples of signals that appear in operation of an I2C bus system 200 in accordance with an embodiment of the invention for the case where there is a single master device 104 and a single slave device 106 in the bus system. FIG. 3 shows cycles numbered 1 to 10 of the clock signal provided by the master device 104 to the SCL line. In clock cycles 1 to 3, the master device 104 provides successively 0, 1, and 0 to the SDA line during the high phase of the clock signal, completing a byte of data transfer, and leaving the SDA line controlled by the slave device 106. In clock cycle 4, the slave device 106 holds the SDA line low (0) to send an ACK to the master device 104. From clock cycles 5 to 8, the slave device 106 holds the SCL line low, using the clock stretching function of the I2C standard. In clock cycle 6, the slave device 106 provides a 1 pulse to the SDA line as alert signal, signaling to the master device 104 that it can resume (if it has the clock stretching function) or repeat (if it does not have the clock stretching function) the data it is sending over the SDA line when the SCL line is released in clock cycle 9.

Figure 6:
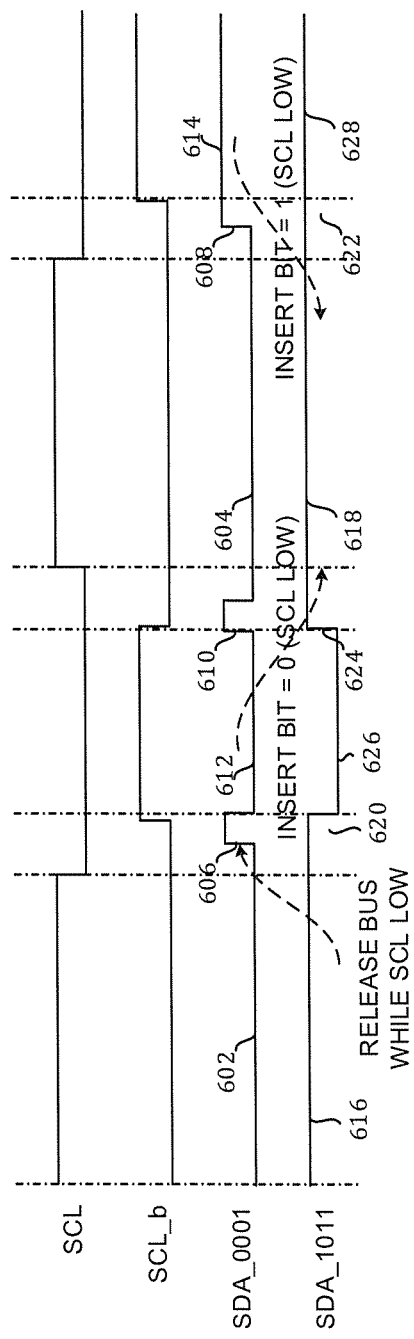
FIG. 6 is a graph against time of signals appearing in operation of the I2C bus system of FIG. 5 for the case where there is more than one slave device in the bus system.

The master and slave devices 104 and 106 that communicate over the I2C bus 102 may release the voltage of the SDA line when the SCL line changes to the low phase and an alerting slave device 106 subsequently pulls the SDA line low to provide an alert pulse. The alerting slave device 106 may release the SDA line after providing the alert signal. In the case shown in FIG. 3 with a single slave device 106, the master device does not need to pulse the SDA line high (1) at the end of the byte transferred. However, in a configuration with more than one slave device in the bus system, all the devices in the bus system are required to release the SDA line to enable alert signals to be distinguished, as shown in FIG. 6. In this case, a slave device 106 pulls the SDA line low first to start sending an alert signal.

When the master device 104 communicates with a plurality of the slave devices 106 over the I2C bus 102, an alerting slave device 106 may provide an alert signal comprising a succession of alert pulses that identifies the alerting slave device 106 to the master device 104. The master device 104 may then prioritize communication with the alerting slave device 106 when the master device detects the identification of the alert signal. The identification may be a small number from the full capacity of addresses of a full one- or two-byte address space according to the I2C standard, if the number of slave devices and allocated addresses is small.

Figure 4:
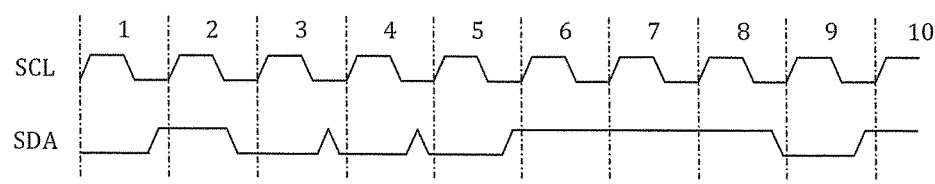

FIG. 4 illustrates examples of signals that appear in operation of an I2C bus system in accordance with another embodiment of the invention. In clock cycles 1 to 4, the master device 104 provides successively 0, 1, 0 and 0 to the SDA line during the high phase of the clock signal during transfer of a byte, which is not complete at clock cycle 4, to a slave device 106. In this example, these bits correspond to the four most significant bits (MSB) of an address in hexadecimal notation of 0x47, 0100 in binary notation, with successive zeros separated by the master device releasing the SDA line briefly in clock cycles 3 and 4. However, during the high phase of clock cycle 5, a slave device 106 starts to send an alert signal and pulls the SDA line low. The master device 104 detects that the SDA line is at a different voltage from the voltage that the master device was sending and switches to detecting the voltage on the SDA line during the low phases of the clock cycles, in order to receive the alert signal from the slave device 106 as well as during the high phases, corresponding to normal IIC data signal transfer. In this example, the alert signal corresponds to the four MSB of an address of 0x30, for example, 0111 in binary notation, during the low phases of clock cycles 5 to 8. Clock cycle 9 corresponds to transfer of an ACK signal, and subsequent clock cycles to normal IIC data signal transfer.

Figure 5:
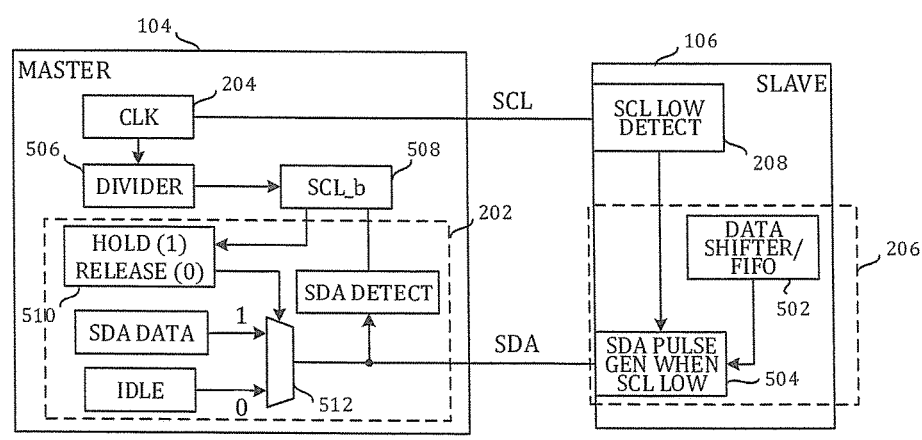
FIG. 5 is a schematic block diagram of a configuration of the I2C bus systems of FIGS. 1 and 2 in accordance with an embodiment of the invention.

FIG. 5 illustrates an example of a configuration of the I2C bus system 100 or 200 in which an embodiment of the invention, given by way of example, is implemented. In the I2C bus system, the SCL detector 208 in the slave device 106 detects the low phases of the clock cycles on the SCL line. The alert signal module 206 has a data shifter and a first-in-first-out (FIFO) register 502 that provides data for the SDA line, including the alert signals and also normal I2C data signals. A pulse generator 504 applies the data pulses to the SDA line at the appropriate high and low phases of the clock cycles.

The clock signal generator 204 of the master device 104 provides the clock signals CLK to the SCL line and also controls a clock low phase divider 506 and inverter 508 that provides an asymmetric clock signal CLK_b that is inverted relative to the clock signal CLK. The low phase of the clock signal CLK_b is prolonged and its high phase shortened relative to the high and low phases respectively of the clock signal CLK. The clock signals CLK and CLK_b are provided to a register 510 that controls a multiplexer (mux) 512. Soon after the start and soon before the end of the low phases of the clock signals CLK, the master device 104 releases the voltage of the SDA line to float up to $V_{DD}$. The master device 104 only applies the SDA data to the SDA line during the period from immediately before the start to immediately after the end of the high phases of the clock signals CLK. The master device 104 therefore does not prevent a slave device 106 from transmitting alert pulse signals while the inverted clock signal CLK_b is high (and the clock signal CLK is low).

FIG. 6 is a graph illustrating signals appearing in an example of operation of the I2C bus system shown in FIG. 5, two clock cycles being shown on a time scale enlarged compared to FIGS. 3 and 4. The signals are illustrated for two cases labeled SDA_0001 and SDA_1011. For the signal SDA_0001, during the high phases of the clock cycles CLK 1 and 2 a normal data transfer 0 (low) bit is set on the SDA line at 602 and 604. After the trailing edges of the clock signal CLK at 606 and 608, and before the rising edges of the inverted clock signal CLK_b at 610, the master and slave devices 104 and 106 release the voltage of the SDA line to float up to $V_{DD}$. During the low phases of the clock cycles CLK 1 and 2, an alerting slave device 106 sets an alert data transfer 0 (low) bit on the SDA line at 612 and an alert data transfer 1 (high) bit at 614. The master device 104 can collate the bits from the high and low phases of the clock cycles CLK at 602, 612, 604 and 614 as 0001.

For the signal SDA_1011, during the high phases of the clock cycles CLK 1 and 2 a normal data transfer 1 (high) bit is set on the SDA line at 616 and 618. After the trailing edges of the clock signal CLK at 620 and 622, and before the rising edges of the inverted clock signal CLK_b at 624, the master and slave devices 104 and 106 release the voltage of the SDA line to float up to $V_{DD}$. During the low phase of the clock cycles CLK 1 and 2, an alerting slave device 106 sets an alert data transfer 0 (low) bit on the SDA line at 626 and an alert data transfer 1 (high) bit at 628. The master device 104 can collate the bits at 616, 626, 618 and 628 as 1011.

The invention may be implemented partially in a non-transitory machine-readable medium containing a computer program for running on a computer system, the program at least including code portions for performing steps of a method according to the invention when run on a programmable apparatus, such as a computer system or enabling a programmable apparatus to perform functions of a device or system according to the invention.

The computer program may be stored internally on computer readable storage medium or transmitted to the computer system via a computer readable transmission medium. All or some of the computer program may be provided on non-transitory computer-readable media permanently, removably or remotely coupled to an information processing system. The computer-readable media may include, for example and without limitation, any number of the following: magnetic storage media including disk and tape storage media; optical storage media such as compact disk media (e.g., CD ROM, CD R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM and so on; and data transmission media including computer networks, point-to-point telecommunication equipment, and carrier wave transmission media, just to name a few.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, a plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

The terms "assert" or "set" and "negate" (or "de-assert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Similarly, any arrangement of components to achieve the same functionality is effectively "associated" such that the desired functionality is achieved. Hence, any two components combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

In the claims, the word 'comprising' or 'having' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an". The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An inter-integrated circuit (I2C) bus system comprising:
　at least one master device; and
　at least one slave device communicating with the master device over a bidirectional two-line I2C bus, the I2C bus having a serial data (SDA) line and a serial clock (SCL) line that are normally high unless a device pulls the voltage of the line low,
　wherein:
　　the master device provides clock signals having high and low phases to the SCL line;
　　one of the master and the slave device, as transmitter, sets normal data signals on the SDA line during the low phase of the clock signals on the SCL line and the normal data signals are transferred to the other device, as receiver, during the high phase of the clock signals on the SCL line; and
　　the slave device provides an alert pulse on the SDA line during the low phase of the clock signals on the SCL line to send an alert signal to the master device.

2. The I2C bus system of claim 1, wherein the master device has an SDA detector that detects normal data signals on the SDA line during the high phase of the clock signals on the SCL line, and that detects pulses of the alert signal on the SDA line during the low phase of the clock signals on the SCL line.

3. The I2C bus system of claim 2, wherein the slave device has a sleep mode during which elements of the slave device are non-operational, and wherein the alerting slave device provides the alert signal when exiting the sleep mode and becoming operational for receiving normal data signals.

4. The I2C bus system of claim 3, wherein the I2C bus system comprises a single master device and a single slave device, and the master device detects an alert signal comprising a pulse on the SDA line.

5. The I2C bus system of claim 3, wherein the master device holds the normal data signals until the master device detects the alert signal.

6. The I2C bus system of claim 2, wherein master and slave devices that communicate over the I2C bus release the voltage of the SDA line when the SCL line changes to the low phase and an alerting slave device subsequently pulls the SDA line low to provide an alert pulse.

7. The I2C bus system of claim 6, wherein the alerting slave device releases the SDA line after providing the alert signal.

8. The I2C bus system of claim 2, wherein the master device communicates with a plurality of the slave devices over the I2C bus, and wherein an alerting slave device provides an alert signal comprising a succession of alert pulses that identifies the alerting slave device to the master device.

9. The I2C bus system of claim 8, wherein the master device prioritizes communication with the alerting slave device when the master device determines the identification of the alerting device.

10. An inter-integrated circuit (I2C) slave device for an I2C bus system comprising at least one master device and at least one slave device communicating over a bidirectional two-line I2C bus, the I2C bus having a serial data (SDA) line and a serial clock (SCL) line that are normally high unless a device pulls the voltage of the line low, wherein the master device provides clock signals having high and low phases to the SCL line, and wherein a master or slave device as transmitter sets normal data signals on the SDA line during the low phase of the clock signals on the SCL line and the normal data signals are transferred to another device as receiver during the high phase of the clock signals on the SCL line, and wherein the slave device comprises:
　an alert module that provides an alert pulse on the SDA line during the low phase of the clock signals on the SCL line to send an alert signal to the master device.

11. The I2C slave device of claim 10, wherein the alert module has an SCL detector that detects the high and low phases of the clock signals on the SCL line, and an alert signal generator that provides the alert signal on the SDA line during the low phase of the clock signals on the SCL line.

12. The I2C slave device of claim 10, wherein the slave device has a sleep mode during which elements of the slave device are non-operational, and wherein the alerting slave device provides the alert signal when exiting the sleep mode and becoming operational for receiving normal data signals.

13. The I2C slave device of claim 10, wherein master and slave devices that communicate over the I2C bus release the voltage of the SDA line when the SCL line changes to the low phase, and wherein the slave device subsequently pulls the SDA line low to provide an alert pulse.

14. The I2C slave device of claim 13, wherein the alerting slave device releases the SDA line after providing the alert signal.

15. The I2C slave device of claim 10, wherein the master device communicates with a plurality of the slave devices over the I2C bus, and wherein the slave device provides an alert signal comprising a succession of alert pulses that identifies the alerting slave device to the master device and enables the master device to prioritize communication with the alerting slave device when the master device identifies the alerting slave device.

16. An inter-integrated circuit (I2C) master device for an I2C bus system comprising at least one master device and at least one slave device communicating over a bidirectional two-line I2C bus, the I2C bus having a serial data (SDA) line and a serial clock (SCL) line that are normally high unless a device pulls the voltage of the line low, wherein a master or slave device as transmitter sets normal data signals on the SDA line during a low phase of the clock signals on the SCL line and the normal data signals are transferred to another, receiver device, during a high phase of the clock signals on the SCL line, the master device comprising:
  a clock module for providing clock signals having high and low phases to the SCL line;
  an SDA transmit module for providing normal data signals to the SDA line during the high phase of the clock signals on the SCL line; and
  an SDA detector that detects normal data signals on the SDA line during the high phase of the clock signals on the SCL line, and detects pulses of the alert signal on the SDA line during the low phase of the clock signals on the SCL line.

17. The I2C master device of claim 16, wherein the master device holds the normal data signals until the master device detects the alert signal signaling that a slave device has exited a sleep mode during which elements of the alerting slave device are non-operational, and has become operational for receiving normal data signals.

18. The I2C master device of claim 16, wherein the master device and any slave devices that communicate over the I2C bus release the voltage of the SDA line when the SCL line goes low, and wherein the alert detector detects an alerting slave device subsequently pulling the SDA line low to provide an alert pulse.

19. The I2C master device of claim 16, for communicating with a plurality of the slave devices over the I2C bus, wherein the SDA detector detects and registers an alert signal comprising a succession of alert pulses that identifies an alerting slave device to the master device.

20. The I2C master device of claim 19, wherein the master device prioritizes communication with the alerting slave device when the master device determines the identification from the succession of alert pulses.

* * * * *